US012735619B2

(12) United States Patent
Chang et al.

(10) Patent No.: US 12,735,619 B2
(45) Date of Patent: Sep. 15, 2026

(54) METHOD FOR PREPARING GRAPHENE-BASED COMPOSITE

(71) Applicant: SHINY CHEMICAL INDUSTRIAL CO., LTD., Kaohsiung City (TW)

(72) Inventors: Kai-Chieh Chang, Kaohsiung City (TW); Chi-Fa Sun, Kaohsiung City (TW)

(73) Assignee: SHINY CHEMICAL INDUSTRIAL CO., LTD., Kaohsiung City (TW)

( * ) Notice: Subject to any disclaimer, the term of this patent is extended or adjusted under 35 U.S.C. 154(b) by 58 days.

(21) Appl. No.: 19/004,888

(22) Filed: Dec. 30, 2024

(65) Prior Publication Data

US 2026/0152682 A1 Jun. 4, 2026

(30) Foreign Application Priority Data

Nov. 29, 2024 (TW) ................................ 113146266

(51) Int. Cl.
*C09K 5/14* (2006.01)
*C08K 3/04* (2006.01)

(52) U.S. Cl.
CPC ................ *C09K 5/14* (2013.01); *C08K 3/042* (2017.05); *C08K 2201/001* (2013.01)

(58) Field of Classification Search
CPC ..... C09K 5/14; C08K 3/042; C08K 2201/001
See application file for complete search history.

(56) References Cited

U.S. PATENT DOCUMENTS

2015/0187456 A1 * 7/2015 Ji ............................ H01B 1/24 264/105

FOREIGN PATENT DOCUMENTS

CN 108276615 A * 7/2018 ................ C08J 5/18
CN 210075901 U * 2/2020
CN 117507504 A * 2/2024 ............. B32B 9/007

OTHER PUBLICATIONS

Zhang et al., "Vertically aligned graphene film/epoxy composites as heat dissipating materials", International Journal of Heat & Mass Transfer, vol. 118, pp. 510-517, 2018, available online Nov. 11, 2017. (Year: 2017).*

Ying et al., "Tailoring Highly Ordered Graphene Framework in Epoxy for High-Performance Polymer-Based Heat Dissipation Plates", ACS Nano 2021, vol. 15, pp. 12922-12934, published Jul. 26, 2021. (Year: 2021).*

* cited by examiner

*Primary Examiner* — Christopher W Raimund

(57) ABSTRACT

A method for preparing a graphene-based composite includes the steps of: providing graphene films; aligning and stacking the graphene films along a first direction perpendicular to surfaces of the graphene films, followed by conducting a hot pressing treatment at a pressure ranging from 10 kg/cm$^2$ to 12 kg/cm$^2$ to allow the surfaces of the graphene films to fuse with each other, so as to form a graphene laminated structure; cutting the graphene laminated structure along the first direction or a second direction that is parallel to the first direction and that is oriented oppositely to the first direction, so as to obtain a graphene sheet having a cutting surface; and depositing copper onto the cutting surface of the graphene sheet by a sputtering process to form a copper film on the graphene sheet, so as to obtain the graphene-based composite.

6 Claims, 1 Drawing Sheet

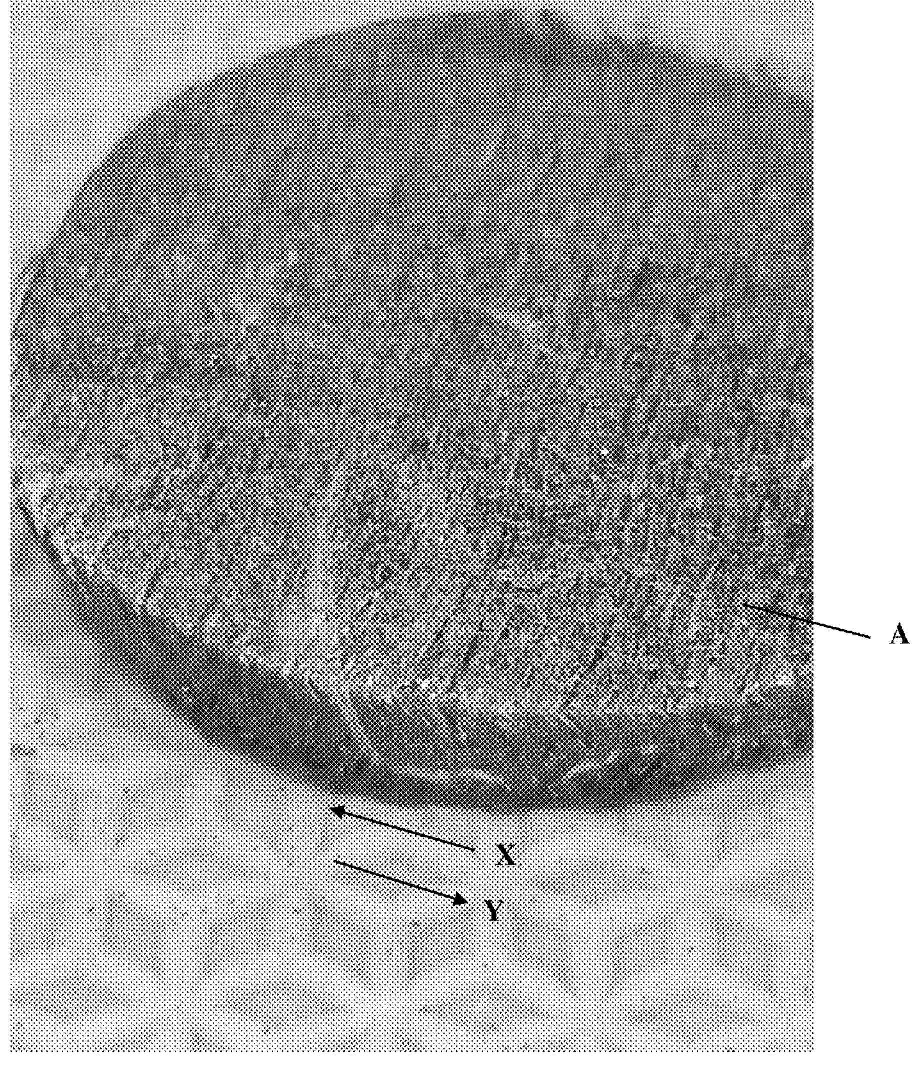
A
X
Y

METHOD FOR PREPARING GRAPHENE-BASED COMPOSITE

CROSS-REFERENCE TO RELATED APPLICATION

This application claims priority to Taiwanese Invention Patent Application No. 113146266, filed on Nov. 29, 2024, the entire disclosure of which is incorporated by reference herein.

FIELD

The present disclosure relates to a method for preparing a graphene-based composite.

BACKGROUND

CN 118421273 A discloses a graphene-based thermally conductive material, a method for preparing a graphene-based thermally conductive film layer using the same and application of the same. The method of CN 118421273 A includes the following steps conducted in sequence: mixing a graphene material, thermally conductive fibers, a dispersing agent, and a solvent (collectively known as the graphene-based thermally conductive material), followed by dispersing and grinding conducted simultaneously, so as to obtain a graphene-based dispersion slurry; applying the graphene-based dispersion slurry to a surface of a substrate, followed by conducting a drying treatment, so as to form a graphene-based thermally conductive film; subjecting the graphene-based thermally conductive film to a heating treatment, so as to obtain a heated graphene-based thermally conductive film; and subjecting the heated graphene-based thermally conductive film to a pressing treatment, so as to obtain the graphene-based thermally conductive film layer. The resultant graphene-based thermally conductive film layer has an in-plane thermal conductivity (also known as a horizontal thermal conductivity coefficient) ranging from 910 $Wm^{-1}K^{-1}$ to 960 $Wm^{-1}K^{-1}$ and a vertical thermal conductivity (also known as a vertical thermal conductivity coefficient) ranging from 10 $Wm^{-1}K^{-1}$ to 16 $Wm^{-1}K^{-1}$.

Graphene is one of the best known thermally conductive materials. A graphene-based composite made of graphene generally has an excellent horizontal thermal conductivity coefficient, while a vertical thermal conductivity coefficient thereof tends to be relatively low, which fails to meet the requirements.

In view of the aforesaid, there is still a need to develop a graphene-based composite which has a relatively high vertical thermal conductivity coefficient.

SUMMARY

Therefore, an object of the present disclosure is to provide a method for preparing a graphene-based composite, which can alleviate at least one of the drawbacks of the prior art.

According to the present disclosure, the method includes the steps of: (a) providing graphene films, each of the graphene films being obtained by subjecting a raw material component containing a graphene powder, a liquid epoxy resin, and a curing agent to a molding process, followed by conducting a solidification process and a demolding process in sequence; (b) aligning and stacking the graphene films along a first direction perpendicular to surfaces of the graphene films, followed by conducting a hot pressing treatment at a pressure ranging from 10 $kg/cm^2$ to 12 $kg/cm^2$ to allow the surfaces of the graphene films to fuse with each other, so as to form a graphene laminated structure; (c) cutting the graphene laminated structure along the first direction or a second direction that is parallel to the first direction and that is oriented oppositely to the first direction, so as to obtain a graphene sheet having a cutting surface; and (d) depositing copper onto the cutting surface of the graphene sheet by a sputtering process to form a copper film on the graphene sheet, so as to obtain the graphene-based composite. In step (a), the liquid epoxy resin is present in an amount ranging from 3 parts by weight to 5 parts by weight, based on a total amount of the graphene powder and the liquid epoxy resin as 100 parts by weight.

BRIEF DESCRIPTION OF THE DRAWINGS

Other features and advantages of the disclosure will become apparent in the following detailed description of the embodiment(s) with reference to the accompanying drawings. It is noted that various features may not be drawn to scale.

The sole figure of this application is a partial image of a graphene sheet of Example 1 (EX1).

DETAILED DESCRIPTION

For the purpose of this specification, it will be clearly understood that the word "comprising" means "including but not limited to", and that the word "comprises" has a corresponding meaning.

It is to be understood that, if any prior art publication is referred to herein, such reference does not constitute an admission that the publication forms a part of the common general knowledge in the art, in Taiwan or any other country.

Unless otherwise defined, all technical and scientific terms used herein have the meaning commonly understood by a person skilled in the art to which the present disclosure belongs. One skilled in the art will recognize many methods and materials similar or equivalent to those described herein, which could be used in the practice of the present disclosure. Indeed, the present disclosure is in no way limited to the methods and materials described.

The present disclosure provides a method for preparing a graphene-based composite, which includes the following steps (a) to (d).

In step (a), graphene films are provided. Each of the graphene films is obtained by subjecting a raw material component containing a graphene powder, a liquid epoxy resin, and a curing agent to a molding process, followed by conducting a solidification process and a demolding process in sequence. The liquid epoxy resin is present in an amount ranging from 3 parts by weight to 5 parts by weight, based on a total amount of the graphene powder and the liquid epoxy resin as 100 parts by weight.

In step (b), the graphene films are aligned and stacked along a first direction (X) perpendicular to surfaces of the graphene films, followed by conducting a hot pressing treatment at a pressure ranging from 10 $kg/cm^2$ to 12 $kg/cm^2$ to allow the surfaces of the graphene films to fuse with each other, so as to form a graphene laminated structure.

In step (c), the graphene laminated structure is cut along the first direction (X) or a second direction (Y) that is parallel to the first direction (X) and that is oriented oppositely to the first direction (X), so as to obtain a graphene sheet having a cutting surface (A).

In step (d), copper is deposited onto the cutting surface (A) of the graphene sheet by a sputtering process to form a copper film on the graphene sheet, so as to obtain the graphene-based composite.

Each of steps (a) to (d) are described in detail hereinafter.

<Step (a)>

By virtue of controlling the amount of the liquid epoxy resin ranging from 3 parts by weight to 5 parts by weight, based on the total amount of the graphene powder and the liquid epoxy resin as 100 parts by weight, the graphene sheet obtained in subsequent step (c) not only has a vertical thermal conductivity coefficient greater than 40 $Wm^{-1}K^{-1}$, but also has a heat resistance temperature greater than 400° C., and hence is capable of exhibiting an excellent vertical thermal conductivity coefficient and an excellent heat resistance. It should be noted that, there will be difficulty in obtaining the graphene films in step (a) if the amount of the liquid epoxy resin is less than 3 parts by weight. If the amount of the liquid epoxy resin is greater than 5 parts by weight, the graphene sheet obtained in subsequent step (c) will not meet the requirement of having the heat resistance temperature of greater than 400° C.

According to the present disclosure, examples of the liquid epoxy resin may include, but are limited to, a bisphenol A type epoxy resin, a bisphenol F type epoxy resin, a polyurethane-modified epoxy resin, a silicone-modified epoxy resin, and a rubber-modified epoxy resin. In certain embodiments, the liquid epoxy resin may be commercial products of EPICLON@ EXA-4850 series which are available from DIC Corporation.

According to the present disclosure, the curing agent is used for a crosslinking reaction with the liquid epoxy resin to allow the raw material component to undergo the solidification process, thereby forming a graphene film. An example of the curing agent may include, but is not limited, triethylenetetramine (TETA). In an exemplary embodiment, the curing agent is a commercial product of D.E.H.24 which is available from Dow Chemical Company.

In certain embodiments, the raw material component further includes a solvent to enhance uniform dispersion of the graphene powder in the raw material component. An example of the solvent may include, but is not limited to, an ether which is selected from the group consisting of propylene glycol methyl ether, propylene glycol methyl ether acetate, and a combination thereof.

According to the present disclosure, in order to ensure the graphene powder in the raw material component achieves a high degree of uniform directionality during the solidification process, the raw material component is filled into the mold, thereby allowing the solidification process to proceed within the mold so as to form a graphene film. In certain embodiments, the solidification process is conducted at a temperature ranging from 60° C. to 120° C.

According to the present disclosure, the mold can be selected as required based on the desired size of the graphene films. In certain embodiments, each of the graphene films has a thickness ranging from 15 μm to 65 μm.

<Step (b) and Step (c)>

By virtue of step (b) and step (c), the graphene films can be neatly arranged in the graphene sheet thus obtained in step (c), and such graphene sheet may have a vertical thermal conductivity coefficient greater than 40 $Wm^{-1}K^{-1}$, and hence has an excellent heat exchange efficiency.

In certain embodiments, in step (b), the hot pressing treatment is conducted at a temperature ranging from 80° C. to 200° C.

According to the present disclosure, in step (b), the number of the graphene films in a stack can be adjusted according to practical requirements. In certain embodiments, the number of the graphene films in the stack is 1500 sheets.

According to the present disclosure, a direction of the cutting surface (A) of the graphene sheet obtained in step (c) is parallel to the first direction (X) and the second direction (Y) as shown in the figure.

In certain embodiments, the graphene sheet obtained in step (c) has a thickness ranging from 5 μm to 70 μm, so that the graphene sheet has an excellent heat exchange efficiency.

<Step (d)>

According to the present disclosure, deposition of copper onto the cutting surface (A) of the graphene sheet by the sputtering process not only reinforces a structure of the graphene sheet, but also enhances thermal conductivity of the graphene-based composite thus obtained.

In certain embodiments, the sputtering process may be a roll-to-roll sputtering process or a magnetron sputtering process. In an exemplary embodiment, the sputtering process is the magnetron sputtering process.

In certain embodiments, the sputtering process is conducted under a flow rate ratio of an argon gas to a nitrogen gas of 1:1 with a total flow rate of 2.5 mL/min, at a temperature ranging from 25° C. to 100° C., a pressure ranging from $1\times10^{-3}$ torr to $1\times10^{-2}$ torr, and a power ranging from 20 W to 200 W.

In certain embodiments, the copper deposited on the cutting surface (A) of the graphene sheet forms the copper film that has a thickness ranging from 5 μm to 15 μm.

The disclosure will be further described by way of the following examples. However, it should be understood that the following examples are solely intended for the purpose of illustration and should not be construed as limiting the disclosure in practice.

Examples

Example 1 (EX1)

A method for preparing a graphene-based composite of EX1 includes the following steps (a) to (d).

<Step (a)>

The amounts of the materials for preparing a graphene film are based on a total amount of a graphene powder and a liquid epoxy resin as 100 parts by weight. First, 95 parts by weight of a graphene powder (manufacturer: Taiwan Graphene Co., Ltd, model no.: GNP-S010) and 100 parts by weight of a mixture of propylene glycol methyl ether and propylene glycol methyl ether acetate (serving as a solvent, a weight ratio of propylene glycol methyl ether to propylene glycol methyl ether acetate being 7:3) were mixed, so as to obtain a graphene slurry. Next, 195 parts by weight of the graphene slurry, 5 parts by weight of the liquid epoxy resin (manufacturer: DIC Corporation, model no.: EPICLONO EXA-4850-150), and 0.25 parts by weight of triethylenetetramine (abbreviated as TETA, serving as a curing agent, manufacturer: Dow Chemical Company, model no.: D.E.H.24) were mixed, so as to obtain a raw material component. Thereafter, the raw material component was poured into a mold and then left to solidify at a temperature of 80° C. for a time period of 6 hours, so as to form the graphene film having a length of 20 cm, a width of 15 cm, and a thickness of 50 μm. Afterwards, the graphene film was demolded from the mold. The aforesaid procedures in step (a) are repeated until a total of 1500 sheets of graphene films are obtained.

<Step (b)>

The total of 1500 sheets of the graphene films obtained in step (a) were stacked in alignment along a first direction (X) perpendicular to surfaces of the graphene films, followed by conducting a hot pressing treatment at a pressure of 10 $kg/cm^2$ and a temperature of 180° C. for a time period of 30 minutes to allow the graphene films to fuse with each other on surfaces thereof, and then harden, so as to form a graphene laminated structure having a length of 20 cm, a width of 15 cm, and a thickness of 15 cm.

<Step (c)>

The graphene laminated structure was cut along the first direction (X) or a second direction (Y) that is parallel to the first direction (X) and that is oriented oppositely to the first direction (X), so as to obtain a graphene sheet of EX1 which had a cutting surface (A). The graphene sheet of EX1 had a length of 15 cm, a width of 15 cm, and a thickness of 50 μm.

<Step (d)>

Copper was deposited onto the cutting surface (A) of the graphene sheet of EX1 by a sputtering process using a magnetron sputtering coater (manufacturer: Dah Young Vacuum Equipment Co., Ltd., model no.: DMRC SP 1800), such that a copper film having a length of 15 cm, a width of 15 cm, and a thickness of 10 μm was formed on the cutting surface (A) of the graphene sheet of EX1, so as to obtain the graphene-based composite of EX1. To be specific, parameters of the magnetron sputtering coater were set as follows: a flow rate ratio of an argon gas to a nitrogen gas of 1:1 with a total flow rate of 2.5 mL/min; a temperature of 60° C.; a pressure of $5\times10^{-3}$ torr; and a power of 110 W.

Comparative Examples 1 to 3 (CE1 to CE3)

The procedures and materials for preparing each of the graphene sheets and the graphene-based composites of CE1 to CE3 were similar to those of EX1, except that the amounts of the graphene powder and the liquid epoxy resin, and the pressure range of the hot pressing treatment were varied as shown in Table 1 below.

TABLE 1

| | | EX1 | CE1 | CE2 | CE3 |
|---|---|---|---|---|---|
| Step (a) | Graphene powder (parts by weight) | 95 | 90 | 85 | 80 |
| | Liquid epoxy resin (parts by weight) | 5 | 10 | 15 | 20 |
| | Temperature of solidification process (° C.) | 80 | 80 | 80 | 80 |
| Step (b) | Temperature of hot pressing treatment (° C.) | 180 | 180 | 180 | 180 |
| | Pressure of hot pressing treatment ($kg/cm^2$) | 10 | 8 | 6 | 4 |
| Step (c) | Thickness of graphene sheet (μm) | 50 | 50 | 50 | 50 |

Property Evaluation

A. Determination of Horizontal Thermal Conductivity Coefficient and Vertical Thermal Conductivity Coefficient The graphene sheet of a respective one of EX1 and CE1 to CE3 was subjected to determination of horizontal thermal conductivity coefficient and vertical thermal conductivity coefficient using an in-plane thermal diffusivity and thermal conductivity measurement apparatus (manufacturer: Long Win Science and Technology Corporation, model no.: LW-9614) in accordance with the procedures set forth in the ASTM E1461 published in 2013). It should be noted that the term "horizontal" means a direction parallel to the cutting surface (A) of the graphene sheet, and the term "vertical" means a direction perpendicular to the cutting surface (A) of the graphene sheet. The results are shown in Table 2 below.

B. Determination of Heat Resistance Temperature

The graphene sheet of the respective one of EX1 and CE1 to CE3 was subjected to determination of heat resistance temperature using a thermogravimetric analyzer (manufacturer: PerkinElmer, Inc., model no.: TGA-4000) at a temperature ranging from 40° C. to 900° C. and a heating rate of 10° C./min.

The results are shown in Table 2 below.

Results

TABLE 2

| | EX1 | CE1 | CE2 | CE3 |
|---|---|---|---|---|
| Horizontal thermal conductivity coefficient of graphene sheet ($Wm^{-1}K^{-1}$) | 1155 | 1100 | 1105 | 1128 |
| Vertical thermal conductivity coefficient of graphene sheet ($Wm^{-1}K^{-1}$) | 46.02 | 37.51 | 35.33 | 32.65 |
| Heat resistance temperature of graphene sheet (° C.) | 430 | 373 | 375 | 382 |

Referring to Tables 1 and 2, by virtue of controlling the amount of the liquid epoxy resin in EX1 to range from 3 parts by weight to 5 parts by weight, based on the total amount of the graphene powder and the liquid epoxy resin as 100 parts by weight, and controlling the pressure of the hot pressing treatment in EX1 to range from 10 $kg/cm^2$ to 12 $kg/cm^2$, the graphene sheet of EX1 not only had a horizontal thermal conductivity coefficient greater than 1130 $Wm^{-1}K^{-1}$, but also had a vertical thermal conductivity coefficient greater than 40 $Wm^{-1}K^{-1}$, and hence had an excellent heat exchange efficiency.

In addition, by virtue of controlling the amount of the liquid epoxy resin in EX1 to range from 3 parts by weight to 5 parts by weight, based on the total amount of the graphene powder and the liquid epoxy resin as 100 parts by weight, the graphene sheet of EX1 had a heat resistance temperature greater than 400° C., and hence had an excellent heat resistance.

Summarizing the above test results, in steps (a) to (c) of the method of the present disclosure, by virtue of the neat arrangement of the graphene films in the graphene laminated structure in combination with the optimization of the amount of the liquid epoxy resin in the raw material component and the pressure range of the hot pressing treatment, the graphene sheet thus obtained has an excellent heat exchange efficiency (i.e., having a vertical thermal conductivity coefficient greater than 40 $Wm^{-1}K^{-1}$) and an excellent heat resistance. In addition, in step (d) of the method of the present disclosure, by virtue of depositing copper onto the cutting surface (A) of the graphene sheet by the sputtering process to form the copper film on the graphene sheet, the graphene-based composite thus obtained is capable of achieving enhanced structural stability, along with excellent heat exchange efficiency and excellent heat resistance.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects; such does not mean that every one of these features needs to be practiced with the presence of all the other features. In other words, in any described embodiment, when implementation of one or more features or specific details does not affect implementation of another one or more features or specific details, the one or more features may be singled out and practiced alone without the another one or more features or specific details. It should be further noted that one or more features or specific details from one embodiment may be practiced together with one or more features or specific details from another embodiment, where appropriate, in the practice of the disclosure.

While the disclosure has been described in connection with what is (are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A method for preparing a graphene-based composite, comprising the steps of:

(a) providing graphene films, each of the graphene films being obtained by subjecting a raw material component containing a graphene powder, a liquid epoxy resin, and a curing agent to a molding process, followed by conducting a solidification process and a demolding process in sequence;

(b) aligning and stacking the graphene films along a first direction perpendicular to surfaces of the graphene films, followed by conducting a hot pressing treatment at a pressure ranging from 10 $kg/cm^2$ to 12 $kg/cm^2$ to allow the surfaces of the graphene films to fuse with each other, so as to form a graphene laminated structure;

(c) cutting the graphene laminated structure along the first direction or a second direction that is parallel to the first direction and that is oriented oppositely to the first direction, so as to obtain a graphene sheet having a cutting surface; and (d) depositing copper onto the cutting surface of the graphene sheet by a sputtering process to form a copper film on the graphene sheet, so as to obtain the graphene-based composite;

wherein in step (a), the liquid epoxy resin is present in an amount ranging from 3 parts by weight to 5 parts by weight, based on a total amount of the graphene powder and the liquid epoxy resin as 100 parts by weight.

2. The method as claimed in claim 1, wherein in step (a), the solidification process is conducted at a temperature ranging from 60° C. to 120° C.

3. The method as claimed in claim 1, wherein in step (b), the hot pressing treatment is conducted at a temperature ranging from 80° C. to 200° C.

4. The method as claimed in claim 1, wherein in step (c), the graphene sheet has a thickness ranging from 5 μm to 70 μm.

5. The method as claimed in claim 1, wherein in step (d), the sputtering process is conducted under a flow rate ratio of an argon gas to a nitrogen gas of 1:1 with a total flow rate of 2.5 mL/min, at a temperature ranging from 25° C. to 100° C., a pressure ranging from $1\times10^{-3}$ torr to $1\times10^{-2}$ torr, and a power ranging from 20 W to 200 W.

6. The method as claimed in claim 1, wherein the graphene sheet obtained in step (c) has a vertical thermal conductivity coefficient greater than 40 $Wm^{-1}K^{-1}$ and a heat resistance temperature greater than 400° C.

* * * * *